H. W. FALK & W. K. ANDREW.
CARBURETER WATER SUPPLY.
APPLICATION FILED NOV. 3, 1911.
1,142,877.
Patented June 15, 1915.
2 SHEETS—SHEET 2.
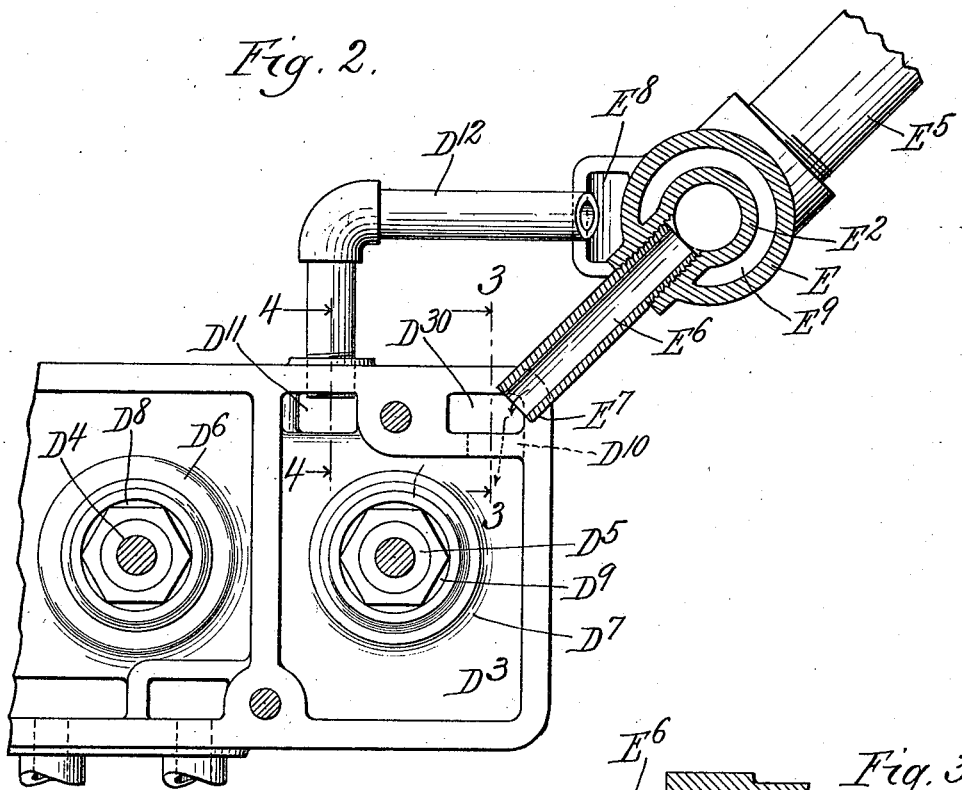
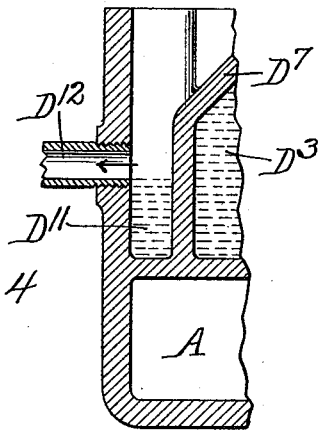
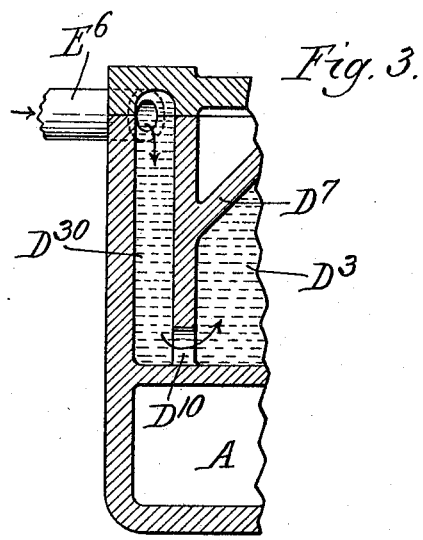
Witnesses,
Edward T. Wray.
Geneva Hirth
Inventors.
Herman W. Falk.
William K. Andrew.
by Parker Carle
Attorneys.

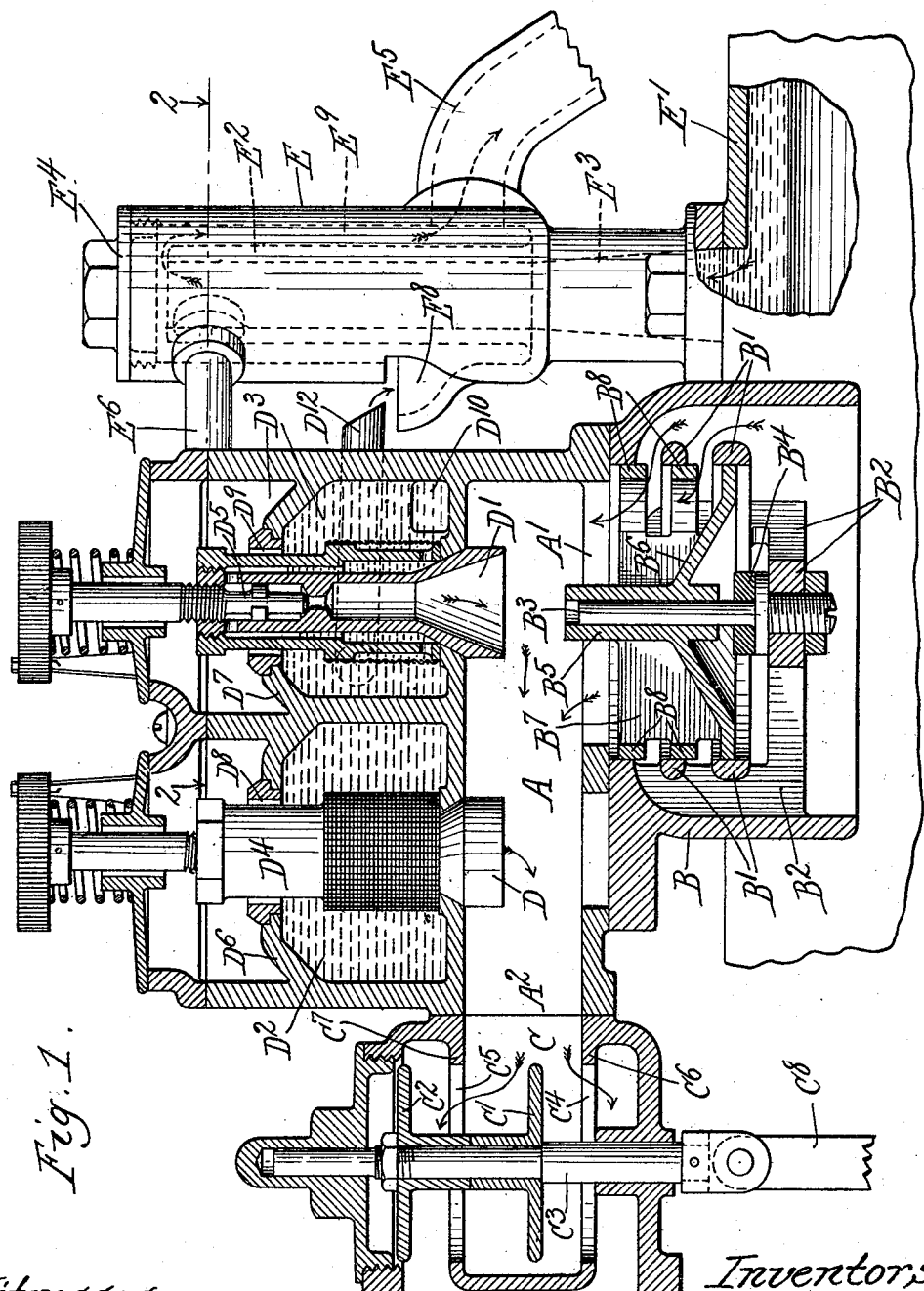

UNITED STATES PATENT OFFICE.

HERMAN W. FALK AND WILLIAM K. ANDREW, OF MILWAUKEE, WISCONSIN, ASSIGNORS TO M. RUMELY COMPANY, OF LAPORTE, INDIANA, A CORPORATION OF INDIANA.

CARBURETER WATER-SUPPLY.

1,142,877.      Specification of Letters Patent.     Patented June 15, 1915.

Application filed November 3, 1911. Serial No. 658,312.

*To all whom it may concern:*

Be it known that we, HERMAN W. FALK and WILLIAM K. ANDREW, citizens of the United States, residing at Milwaukee, in the county of Milwaukee and State of Wisconsin, have invented a certain new and useful Improvement in Carbureter Water-Supplies, of which the following is a specification.

Our invention relates to improvements in water supply for carbureters, and is illustrated diagrammatically in one form in the accompanying drawings, wherein—

Figure 1 is a section through a carbureter; Fig. 2 is a section along the line 2—2 of Fig. 1; Fig. 3 is a section along the line 3—3 of Fig. 2; Fig. 4 is a section along the line 4—4 of Fig. 2.

Like parts are indicated by the same letters in all the figures.

The vacuum, mixing or carbureting chamber A is provided at one end with the air intake port $A^1$ and at the other end with the mixture discharge port $A^2$. The cage B made up of the annular members $B^1$ held in position and spaced one from the other by the spider frame $B^2$, is concentric with the port $A^1$. The pin $B^3$ projects upwardly from the center of the spider arm frame and is surrounded at its base adjacent the spider arm frame by the fiber washers $B^4$. The sleeve $B^5$ is slidably mounted upon the pin $B^3$ and carries the diaphragm $B^6$ from which projects upwardly the cage $B^7$ slightly lesser in diameter than the cage B and made up of the spaced annular members $B^8$. The mixture discharge port $A^2$ communicates with the valve chamber C in which are located the two balanced poppet valves $C^1$, $C^2$ carried by the slidable valve stem $C^3$ and located in opposition to the valve seats $C^4$, $C^5$, in the walls $C^6$, $C^7$. The valve stem $C^3$ is reciprocated by any suitable controlling means operating through the connecting rod $C^8$. The oil and water is fed to the carbureting chamber through the conical valve nozzles D $D^1$, the supply to which from the chambers $D^2$ $D^3$ is controlled by the adjustable needle valves $D^4$ $D^5$. The chambers $D^2$ $D^3$ are provided each with the upwardly projecting conical partition walls $D^6$ $D^7$, which walls are each provided with the perforations $D^8$ $D^9$ through which project the needle valves $D^4$ $D^5$. The water reservoir $D^3$ is provided with the well $D^{30}$ in the side wall thereof, having the port $D^{10}$ discharging from its bottom into the bottom of the chamber $D^3$ and is provided with the well $D^{11}$ communicating with the chamber $D^3$ above the partition wall and having the horizontally disposed discharge pipe $D^{12}$ in communication therewith.

The cylindrical casing E is mounted upon the cylinder water jacket $E^1$ and contains the upwardly projecting cylindrical pipe $E^2$ communicating by means of the passage $E^3$ with the interior of the water jacket. The casing E is closed at the upper end by the screw threaded plug $E^4$ which is located slightly above the top of the pipe $E^2$, thus leaving a communication between the inside and outside of the pipe at its top. The pipe $E^5$ connects the water circulating pump not shown with the casing E. The pipe $E^6$ leads from the casing E slightly below the top of the pipe $E^2$ through the port $E^7$ in the wall of the carbureter discharging into the well $D^{30}$. The funnel or lip $E^8$ which is located beneath the end of the discharge pipe $D^{12}$ projects outwardly and upwardly from the wall of the cylinder E and communicates with the passage $E^9$ which discharges directly into the interior of the pipe $E^5$.

The use and operation of our invention is as follows: As the engine operates it draws air through the mixing chamber in the usual manner, the air being there mixed with the hydrocarbon and water to form a combustible mixture. In order that a mixture of the correct richness may be obtained, it is necessary that the level of the liquid in each one of the reservoirs be maintained constant. This level in my preferred form is maintained constant by maintaining a constant flow of liquid from the lower portion of the reservoir chamber up through the perforations in the dividing wall and out of the carbureter. In our preferred form the water which is supplied to the carbureter is the heated cooling water from the engine jacket. This water enters stand pipe in the cylindrical casing or drum near its base, being fed thereto by the circulating pump, fills the pipe and overflows, passing down about the exterior thereof. It will be observed that the pipe and drum are of such dimensions that there will be a constant flow of water over the top of the pipe, thus the water level will be maintained constant at approximately the top of the pipe. The horizontally disposed pipe which communicates with the stand pipe slightly below the top thereof will permit water to overflow into the well in the reservoir wall. The water will pass down through this well and be discharged into the interior of the reservoir through the port near its base. Since the pipe leading from the cylinder is located above the top of the partition wall, it will be evident that there will be a sufficient head to cause the water to constantly flow out from this partition wall into the discharge well, whence it is returned through the discharge pipe and funnel back to the drum outside of the central pipe and thence to the pipe $E^5$. By this means we are enabled to maintain a constant head of water in the valve reservoir since the water is fed through this reservoir into the cylindrical casing and discharges from the cylindrical casing back to the circulating pump and thence to the pipe within the cylindrical casing without waste and without any appreciable variation in the head owing to any change in the temperature of the water or the speed at which it is discharged by the circulating pump.

While the water fed from the cylinder jacket to the stand pipe will be more or less heated by the heat of the engine, still the large mass and the large exposed area in proportion to the volume of the cylindrical casing will to a large extent permit the water to be cooled. In addition to this, the relatively small amount of water fed from the casing to the carbureter reservoir will be cooled as it passes to the reservoir and will be cooled by the reservoir itself, and by the fresh fuel fed to the other, namely, the fuel reservoir. The result will be that any heating effect will be practically negligible, and this is as it should be, as applicants' device is a so-called cold carbureter, and is designed for use with the heavier hydrocarbons or liquid fuels. Thus the jacket temperatures cannot of course have any practical effect upon the atomization or mixing of the heavy fuels used, and even if a maximum temperature of over 200° were maintained for the entire period and this is of course not possible or desirable, still there would be no vaporizing effect.

The water is fed up through the passage $E^3$ by the pump which circulates the water in the engine jacket. This water may be fed or discharged by any other suitable means, but in one preferred form of device we use this pump, and since we have only shown a portion of the engine we have not illustrated this pump, although it may be any usual water circulating pump centrifugal or otherwise. The water passes up through the column $E^2$ and fills it and part of it flows over the top of the column through the space $E^9$ and out through the pipe $E^5$. Some of the water, however, will flow through the pipe $E^6$ which passes through the part $E^2$, the space $E^9$ and the wall of the chamber E to the well $D^{30}$. The water will pass down through the well $D^{30}$ substantially filling it and pass through the port $D^{10}$ and into the chamber $D^3$. Here the water again divides. Part of it enters the aperture and part of it passes through the screen about the base of the valve, through the aperture closed by the stream, up around the central housing, through the apertures in the top of the central housing, down past the valve $D^5$ and thence to the carbureting chamber. The water which does not pass through the valve will pass up over the top of the ring $D^9$, down the wall $D^7$, into the well $D^{11}$, being discharged from the bottom of the well through the pipe $D^{12}$ to the cup $E^8$ and thence into the chamber or space $E^9$ and out through the pipe $E^5$. It will be noted that the space $E^9$ will not be completely filled with water, owing to its very large cross sectional area relative to the column $E^2$ and owing to the fact that a large quantity of the water passes out through the pipe $E^6$. As a matter of fact the water merely trickles down or flows down in a more or less thin annular sheet or cylinder along the outside of the column $E^2$ to the bottom of the space $E^9$ and thence is discharged. By this arrangement it will be observed that we are able to supply a very closely regulated amount of water to the mixing chamber of my carbureter. Our carbureter is designed for use with engines where very close regulation is absolutely essential. It is designed to burn the heavy fuel oils, solar oil, kerosene and the like and therefore it is much more important that exactly the correct proportions of oil and water be fed to the carbureting chamber than in the case of the usual type of gasolene engine. As is well known, it is desirable to burn water in the engine together with the heavier oils for reasons which we will not discuss, but experience has shown that while the correct amount of water will be very beneficial an incorrect amount is disastrous. For this reason it is essential that the closest kind of regulation of the water supply be effected, and this is what our device does. It gives a constant water level from which the water may be fed to the carbureting chamber no matter what the temperature of the water, the pressure of the water or the velocity of the water in the engine jacket or other supply may be. As such it has proved of the greatest importance.

We claim:

1. A constant level liquid supply means comprising a stand-pipe open at the top, a cylindrical housing mounted on and surrounding the upper end of the pipe, an outflow pipe discharging from the lower portion of said housing, a return funnel in the wall of said housing below the top of the stand-pipe.

2. The combination with a constant level reservoir of means for feeding liquid thereto and withdrawing it therefrom, said means comprising a stand pipe open at both ends, a housing surrounding the upper end of said stand pipe, said housing being closed at its lower end, a discharge from the bottom of said housing, a cup in the wall of said housing adjacent its lower end, a pipe communicating with the interior of the stand pipe adjacent its upper end and passing through the space between the stand pipe and the wall of the housing and discharging to the constant level reservoir, and a pipe leading from the constant level reservoir and terminating above the cup in the wall of said housing.

3. Means for supplying a liquid to a constant level reservoir comprising a stand pipe, means for conducting water from the interior of said stand pipe at a point immediately below its top to the constant level reservoir, said stand pipe being open at its top, a housing closed at the bottom surrounding said stand pipe, a discharge from the bottom of said housing, and a discharge from the constant level reservoir to said housing at a point intermediate its top and bottom.

HERMAN W. FALK.
WILLIAM K. ANDREW.

Witnesses:
E. A. WUSKER,
C. F. HARMON.

Copies of this patent may be obtained for five cents each, by addressing the "Commissioner of Patents, Washington, D. C."